United States Patent
Halpaus et al.

(10) Patent No.: US 6,641,097 B1
(45) Date of Patent: Nov. 4, 2003

(54) DEVICE FOR FIXING ANY TYPE OF OBJECT ON CEILING AND WALLS

(76) Inventors: Wolfgang Halpaus, Heinrich-Lanz-Ring 5, D-68519 Viernheim (DE); Karlheinz Herzig, Melibokusstrasse 5, D-68519 Viernheim (DE)

( * ) Notice: Subject to any disclaimer, the term of this patent is extended or adjusted under 35 U.S.C. 154(b) by 0 days.

(21) Appl. No.: 09/937,523
(22) PCT Filed: Feb. 5, 2000
(86) PCT No.: PCT/DE00/00360
§ 371 (c)(1), (2), (4) Date: Nov. 28, 2001
(87) PCT Pub. No.: WO00/57092
PCT Pub. Date: Sep. 28, 2000

(30) Foreign Application Priority Data

Mar. 23, 1999 (DE) .......................... 199 13 009

(51) Int. Cl.$^7$ .................................. F16L 3/08
(52) U.S. Cl. ................... 248/222.52; 248/317; 403/348
(58) Field of Search ................ 248/222.52, 222.51, 248/317, 320, 324, 342, 343, 72; 403/348, 405.1

(56) References Cited

U.S. PATENT DOCUMENTS

| | | | | |
|---|---|---|---|---|
| 2,859,710 A | * | 11/1958 | Elsner .......................... 248/502 |
| 3,208,560 A | * | 9/1965 | Cote .......................... 403/252 |
| 4,542,871 A | * | 9/1985 | Fortsch .......................... 248/73 |
| 4,545,697 A | * | 10/1985 | Verdenne et al. ............. 403/230 |
| 4,645,393 A | * | 2/1987 | Pletcher .......................... 411/84 |
| 4,662,590 A | * | 5/1987 | Hungerford, Jr. ............. 248/72 |
| 4,830,531 A | * | 5/1989 | Condit et al. ................ 403/348 |
| 5,271,586 A | | 12/1993 | Schmidt |
| 5,375,798 A | * | 12/1994 | Hungerford, Jr. ............. 248/58 |
| 5,624,217 A | * | 4/1997 | Hungerford, Jr. ............. 411/85 |
| 6,447,200 B1 | * | 9/2002 | Hungerford, III ........ 403/374.1 |

FOREIGN PATENT DOCUMENTS

| | | |
|---|---|---|
| DE | 41 28 157 C1 | 9/1992 |
| DE | 19617750 C1 * | 10/1997 |
| EP | 0671581 A2 * | 9/1995 |
| GB | 2 080 904 A | 2/1982 |

* cited by examiner

Primary Examiner—Raman O. Ramirez
(74) Attorney, Agent, or Firm—Alston & Bird LLP

(57) ABSTRACT

A device for mounting objects of various kinds to ceilings and walls, including a receptacle (1) adapted for being directly connected to the ceiling or wall and an anchoring unit (2) serving to hold the objects. The anchoring unit comprises a locking element (3) which extends into the receptacle (1), a contact element (4) which lies against the outside of the receptacle (1), and connecting means (5) joined at least to the contact element (4) for a connecting element (6). The anchoring unit (2) is adapted for mounting by inserting the locking element into the receptacle, then rotating the contact element which is outside the receptacle and so that the locking element is initially restrained against rotation and then snaps into a locking position behind the shoulders (7) on both sides of the receptacle (1). For realizing a simple handling in the simplest construction, the locking element (3) is connected to the contact element (4) via an elastic member (8), which serves both to reset the rotational movement between the contact element (4) and the locking element (3) for purposes of moving the locking element (3) to its locking position behind the shoulders upon rotating the contact element (4), and keeping it in this position.

20 Claims, 2 Drawing Sheets

DEVICE FOR FIXING ANY TYPE OF OBJECT ON CEILING AND WALLS

The invention relates to a device for mounting objects of various types to ceilings and walls, with a receptacle adapted for being directly connected to the ceiling or wall and an anchoring unit serving to hold the objects, the anchoring unit comprising a locking element for extending into the receptacle, a contact element serving to lie against the receptacle, and connecting means associated at least to the contact element for a connecting element, the anchoring unit being adapted for being mounted in the receptacle by rotating the engaged locking element relative to the contact element, and by a thereby caused engagement behind the shoulders of the receptacle.

Devices of the described kind have been known from practice for years, for example, from DE 196 17 750 C1. According to the device disclosed in DE 196 17 750 C1, a locking element and a contact element form an anchoring unit. The contact element is used to lie externally against the receptacle and locking element for engaging behind a receiving element. The receptacle is designed and constructed as a cross sectionally U-shaped element with inwardly projecting shoulders and retaining projections.

In the known device, the anchoring unit is extremely costly to construct and has only a limited operational reliability. Operative between the contact element and the locking element is a biasable resetting element, which is designed and constructed as a spring. After rotating the contact element relative to the locking element, the latter is able to move within the receptacle, and to return to its original position relative to the contact element. Accordingly, the resetting element or the spring used therefor causes the locking element to snap in within the receptacle. With respect to the assembly, such a spring is a costly component, inasmuch as it is necessary to provide for the resetting element or for the spring special contact surfaces or abutments within the contact element.

Moreover, the known anchoring unit operates only in combination with special connection means, which hold together the contact element and the locking element. To this extent, it is absolutely necessary that the contact element and the locking element be rotatably interconnected via a threaded rod or the like. At any rate, a special connection is mandatory between the two elements. Otherwise, these two elements would fall apart.

Furthermore, in the known anchoring unit, the contact element is provided with a very special sliding surface, which causes the locking element to rise. Accordingly, during the rotation of the contact element, the locking element is forced to remove itself from the contact element for purposes of overcoming the inwardly projecting shoulders or retaining projections of the receptacle, and engaging behind them as a whole. Likewise, such a construction is expensive.

It is therefore an object of the present invention to improve and further develop a device of the generic kind for mounting objects of any kind to ceilings or walls in such a manner that it permits a simple and safe handling in a simplest construction.

SUMMARY OF THE INVENTION

The above and other objects and advantages of the invention are achieved by the provision of a mounting device of the described type wherein the locking element connects via elastic means to the contact element, and wherein the elastic means serves at the same time for resetting the rotational movement between the contact element and the locking element for purposes of bringing the locking element to an engaging position during the rotation of the contact element, and holding it in this position.

In accordance with the invention it has been recognized that a particularly simple design and construction of the device is possible, when the locking element and the contact element are interconnected via elastic means, which simultaneously serves to reset the rotational movement between the contact element and the locking element for purposes of bringing the locking element to its engaging position behind the shoulders during the rotation of the contact element, and holding it in this position. Consequently, the elastic means equally assumes two functions, namely holding together the locking element and the contact element, and secondly causing with an adequate bias during the initial rotation of the contact element, a subsequent rotation of the locking element within the receptacle, so that when the locking element engages the shoulders from behind, the relative position between the locking element and the contact element corresponds again to the original positioning between the two parts. Described in other words, after insertion of the locking element into the receptacle, and upon rotation of the outer contact element which is positioned in contact with the outside of the shoulders, the locking element is initially restrained against concurrent rotation by contact with the shoulders of the receptacle so as to cause relative rotation of the elements. Once the resistance of the shoulders is overcome, the biasing force then rotates the locking element back to the original relative rotational position with the contact element so that the locking element is positioned behind the shoulders. Contrary to the device known from the prior art, special holding means between the contact element and the locking element are no longer needed.

Within the scope of a particularly advantageous development, the elastic means is designed and arranged in such a manner that during the rotation of the contact element relative to the locking element, it causes the locking element to become spaced apart from the contact element abutting the receptacle, and thus to lift for engaging behind the shoulders. Insofar, a third function is attached to the elastic means, namely to cause the locking element to lift for overcoming and engaging behind the shoulders. This results in a particularly simple construction of the claimed device, which avoids the usual sliding surfaces of the prior art for effecting a lifting of the locking element.

Specifically, the lifting of the locking element results from the fact that during the rotation of the contact element, the elastic means slides, pushes, or clamps at least somewhat between the contact element and the locking element, thereby causing a spacing to develop between the locking element and the contact element. According to the dimensioning of the elastic means, this spacing must be large enough for permitting an engagement behind the inwardly projecting shoulders of the receptacle. Afterovercoming the shoulders, the locking element is able to rotate within the receptacle, and to return to its original position relative the contact element, after fully engaging behind the shoulders. With that, a mounting of the anchoring unit is already achieved. For a stabilization, it is then necessary to screw together the parts of the anchoring unit, for example, by means of a threaded rod and a nut, as will be described further below.

Preferably, the elastic means is made of rubber. As a specific example, the elastic means may be an endless rubber band. In a further advantageous manner, the rubber band is looped about the locking element and attached to the contact element preferably in a biased state. In this state, the rubber band may extend with crossing band sections over the locking element, and engage behind the contact element through corresponding cutouts, so that in the biased state of the rubber band, a safe and elastic connection is realized between the contact element and the locking element, at least to an adequate extent, in order to move the anchoring unit to the engaging position.

When a rubber band is used as an elastic means, same may push with its respective band sections between the contact element and the locking element during the rotation of the contact element, thereby initiating a lifting movement of the locking element on four sides of the locking element or the contact element. An even spacing between the locking element and contact element is thus realized in that the locking element is able to overcome the inwardly projecting shoulders.

The thickness of the rubber band should approximately correspond to the thickness of the shoulders that are to be overcome by the locking element, so as to be able to ensure an adequate lifting for overcoming the shoulders and engaging behind them.

Furthermore, it will be of advantage, when the locking element with its edge sections serving to engage behind the shoulders is lifted in a spaced manner relative to its surface serving to contact the contact element. In this respect, it is possible to move the locking element, with the contact element or by bringing the contact element into contact with receptacle, already inward behind the region of the shoulders, so that at most a slight lifting is necessary for the engagement from behind by the locking element. To assist the necessary engagement behind the shoulders by the locking element, it would be possible to bevel the locking element on its edge sections serving to engage behind the shoulders in such a manner that opposite to the shoulders, a sliding surface is formed, which facilitates the engagement. As an alternative and/or in addition thereto, it would be possible that the shoulders of the receptacle slope toward the free inner side, or narrow in their thickness, and thus form a sliding surface, which facilitates the rear engagement by the locking element. This would likewise assist the engaging rotational movement of the locking element within the receptacle.

The locking element itself could be designed and constructed in the way of a parallelogram or trapezoid, and when being in its rotated and engaged state, come to lie with its two short edges against opposing inner walls of the receptacle. This makes it necessary to adapt the dimensioning of the locking element on the one hand and of the receptacle on the other. At the same time, the short edges of the locking element form with the inner walls of the receptacle a contact or a corresponding stop, which prevents the locking element from further rotating and thus from disengaging from its engaging position.

Furthermore, it will be of a very special advantage, when the raised portion of the locking element, which is formed for purposes of a spacing between the contact element and the locking element, is configured and dimensioned such that during the engagement from behind by the locking element, it extends from within the receptacle into the region between the shoulders, and that it is dimensioned such as to form an antirotation device for the locking element. This prevents a further rotation of the locking element effectively, at least when an intact connection is realized between the locking element and the contact element as a result of the elastic means or rubber band.

It is likewise possible that the contact element includes engagement flanks, which extend toward the locking element. These engagement flanks extend at least somewhat from outside into the region between the shoulders after the rotation of the contact element, which leads to the engagement from behind by the locking element, and after the locking element has reached its engaged position, and they form likewise an antirotation device for the contact element. This would secure both the locking element from the inside of the receptacle and the contact element from the outside of the receptacle against rotation relative to the inwardly projecting shoulders.

For a more extensive connection between the contact element and the locking element, in particular, however, for mounting objects of any kind to the thus realized anchoring unit, the connecting means of the contact element include, preferably in the center, an opening for an anchoring rod. Other holding measures are realizable. The here addressed anchoring rod is merely exemplary. The opening in the contact element could be provided with an internal screw thread.

Furthermore, the connecting means could include a preferably central opening in the locking element, which may likewise be provided with an internal screw thread. The above-mentioned anchoring rod could extend through the opening in the contact element into the locking element, and be screwed both to the latter and the contact element, thereby permitting a relative rotational movement between the contact element and the locking element. Specifically, the anchoring rod could be configured as a threaded rod, so that any desired, additional holders, for example, for receiving tubes or the like, may be applied to the external screw thread of the threaded rod. By screwing together the anchoring unit or the parts forming the anchoring unit, namely the contact element and the locking element, a reliable anchoring to the receptacle is realized, and means are made available for purposes of being able to mount or hang objects to the secured anchoring unit.

Finally, it should be remarked that the receptacle may be configured as a special section rail with a substantially U-shaped cross section and inwardly projecting shoulders. It is important that shoulders of whatever design and construction be provided, so that a support of the anchoring unit can be realized by the clamping effect between the locking element and the contact element.

BRIEF DESCRIPTION OF THE DRAWINGS

There exist various possibilities of improving and further developing the teaching of the present invention in an advantageous manner. To this end, reference may be made to the following description of a preferred embodiment of the invention with reference to the drawing, in which.

DETAILED DESCRIPTION OF THE PREFERRED EMBODIMENT

Figure 1:
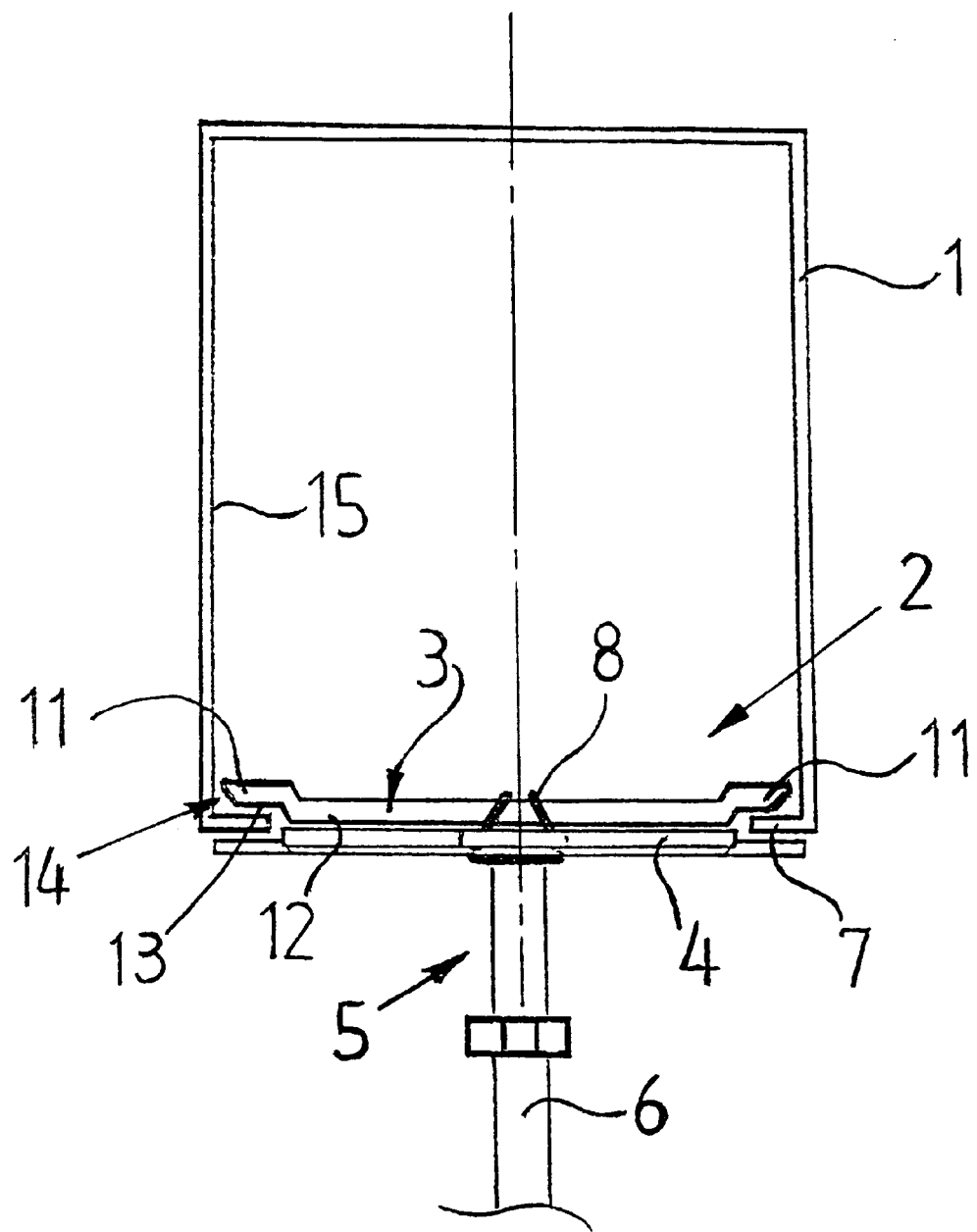
FIG. 1 is a schematic side view of a device according to the invention for mounting objects of any kind to ceilings or walls, wherein an anchoring unit is inserted into special section rail.

FIG. 1 is a schematic side view of a device according to the invention for mounting objects of any kind to ceilings and walls, with a receptacle 1 adapted for being directly connected to the ceiling or wall. Concretely, the receptacle 1 is merely a special section rail shown in a cross sectional schematic view. Besides receptacle 1, the device includes an anchoring unit 2, which is used to hold the objects. The anchoring unit 2 in turn comprises a locking element 3 serving to extend into receptacle 1, a contact element 4 serving to lie against receptacle 1 in the way of an abutment, and connecting means 5 for a connecting element, which is joined to contact element 4 and locking element 3. By rotating contact element 4 relative to locking element 3 extending into receptacle 1, and by a thereby caused engagement behind shoulders 7 on both sides of receptacle 1, it is possible to secure the anchoring unit 2 by locking element 3.

FIG. 1 shows a situation, in which the anchoring unit 2 is in its secured state, or in which the locking element 3 engages behind shoulders 7. As further indicated in FIG. 1, a threaded rod 6 is provided as a connecting element, which equally interconnects locking element 3 and contact element 4.

In accordance with the invention, the locking element 3 connects to contact element 4 via elastic means 8. The elastic means 8 is simultaneously used for resetting the rotational movement between contact element 4 and locking element 3, namely for purposes of moving locking element 3 to its engaging position behind shoulders 7 by rotating contact element 4, and holding it in this position. The connecting element 6 shown in FIG. 1 may be subsequently arranged, but is by no means mandatory for engaging anchoring unit 2 in receptacle 1.

Figure 2:
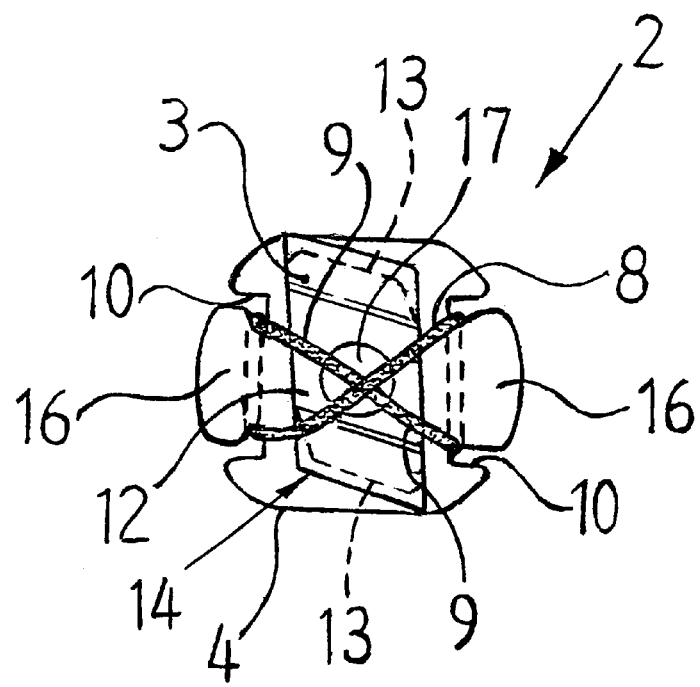
FIG. 2 is a top view of the anchoring unit, which shows the interaction of the contact element and the locking element, as well as their interconnection by means of a rubber band.

As jointly shown in FIGS. 1 and 2, the elastic means 8 is configured and arranged such that during the rotation of contact element 4 relative to locking element 3, it causes the locking element 3 to remove itself from contact element 4 abutting receptacle 1 and, with that, to lift for engaging behind shoulders 7. To this end, the elastic means 8 pushes itself into the region between the contact element 4 and locking element 3.

In the illustrated embodiment, the elastic means 8 is realized by an endless rubber band 8. The rubber band 8 loops about the locking element 3, and is attached to contact element 4 in a biased state. In this state, the rubber band 8 extends with crossing band sections 9 over the locking element 3 and engages behind contact element 4 through cutouts 10. As a result, the locking element 3 is secured to contact element 4 in the "fashion of suspenders". During a rotation of contact element 4, the rubber band 8 pushes itself with its respective band sections 9, quasi symmetrically, between contact element 4 and locking element 3, thereby causing the locking element 3 to lift for engaging behind shoulders 7 of receptacle 1. The rubber band 8 has approximately a thickness, which corresponds to the thickness of the shoulders 7 that are to be overcome.

Figure 3:
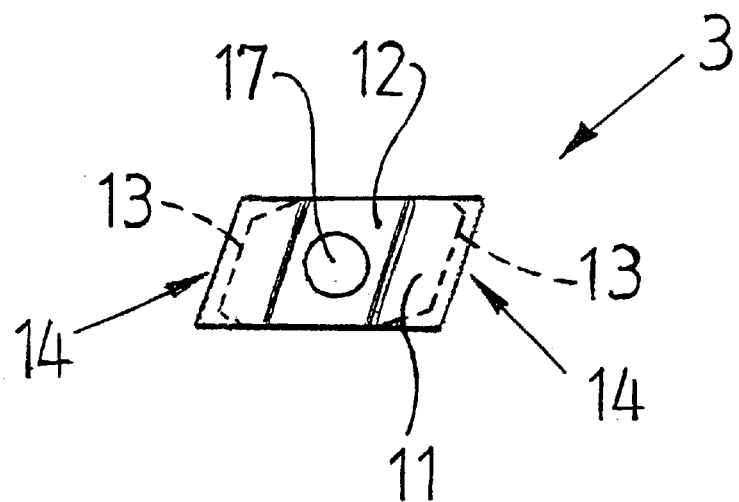
FIG. 3 is a top view of the locking element of the anchoring unit.

As further indicated in FIGS. 2 and 3, the locking element 3 with its edge sections 11 serving to engage behind shoulders 7 is raised relatibe to form a planar surface that serves to contact contact element 4. This region is identified by numeral 12. This arrangement facilitates the engagement behind shoulders 7 by locking element 3.

Furthermore, on its edge sections 11 serving to engage behind shoulders 7, the locking element 3 is beveled in such a manner that opposite to shoulders 7, a sliding surface 13 is formed, which facilitates the engagement from behind. This sliding surface 13 is only indicated in FIGS. 2 and 3. In FIG. 2, the sliding surfaces 13 are formed on the side facing the contact element 4, and only indicated in the Figure.

It is likewise possible that the shoulders 7 of receptacle 1 slope toward their free inner side or narrow in their thickness, thereby forming a sliding surface, which facilitates the rear engagement by locking element 3. This is not shown in the Figures.

As best seen in FIGS. 2 and 3, the locking element 3 is designed and constructed in the manner of a parallelogram. As can be noted in addition from FIG. 1, the locking element 3, when being in its rotated and engaged state, comes to lie with its short edges 14 against opposing inner walls 15 of the receptacle 1.

As further indicated in FIG. 1, the raised portion 12 for forming the spacing between contact element 4 and locking element 3 is configured and dimensioned such that it extends in the engaged state of locking element 3 from within the receptacle 1 and into the region between the shoulders 7, and that it is dimensioned such as to form an antirotation device for locking element 3.

As can further be noted from FIG. 1, the contact element 4 comprises engagement flanks 16 extending toward locking element 3. After rotating contact element 4 for causing locking element 3 to engage, and after reaching the engaging position of locking element 3, these engagement flanks engage at least slightly from the outside of receptacle 1 into the region between shoulders 7, and form in this place likewise an antirotation device, in this instance for contact element 4.

As jointly shown in the Figures, the connecting means 5 of contact element 4 include in the center an opening 17 for the threaded rod 6. Both the opening 17 in contact element 4 and the opening 17 in locking element 3 are made with an internal screw thread, so that a threaded rod 6 with a corresponding external screw thread can be screwed into opening 17. The threaded rod 6 permits screwing the locking element 3 tightly to contact element 4, so that a clamping effect can be realized toward the shoulders 7 of the receptacle and, thus, a safe connection of anchoring unit 2.

Finally, it should be noted that the foregoing, merely exemplary embodiment is used to describe in greater detail the claimed teaching, without however limiting it to the embodiment.

What is claimed is:

1. A device for mounting objects to ceilings or walls, comprising a receptacle adapted for being directly connected to the ceiling or wall and comprising parallel sides and an inwardly directed shoulder on each side, and an anchoring unit for holding the objects, the anchoring unit comprising a locking element which is sized to extend into the receptacle, a contact element which is sized to lie against the outside of the shoulders of the receptacle, and connecting means joined at least to one of the locking element and the contact element for a connecting element, the anchoring unit being adapted for being mounted in the receptacle by rotating the locking element relative to the contact element, and by a thereby caused engagement of the locking element behind the shoulders on both sides of the receptacle, and elastic means operative between the locking element and the contact element for supporting the locking element and the contact element in an original relative rotational position and for biasing the locking element back to the original position upon relative rotation therebetween, wherein the elastic means is configured and arranged such that during the rotation of the contact element relative to the locking element, it slides or pushes at least somewhat between the contact element and the locking element, so that a spacing results between the locking element and the contact element and thus a lifting of the locking element to facilitate the positioning of the locking element behind the shoulders.

2. The device of claim 1, wherein the elastic means is made of rubber.

3. The device of claim 1, wherein the elastic means comprises an endless rubber band.

4. The device of claim 3, wherein the rubber band is looped about the locking element and secured to the contact element in a biased state.

5. The device of claim 4, wherein the rubber band extends over the locking element with crossing band sections and engages behind the contact element through cutouts.

6. The device of claim 3, wherein during the rotation of the contact element, the rubber band pushes itself with its respective band sections between the contact element and locking element.

7. The device of claim 3, wherein the thickness of the rubber band approximately corresponds to the thickness of the shoulders on the sides of the receptacle that are to be overcome by the locking element.

8. The device of claim 1, wherein the locking element has edge sections serving to engage behind the shoulders and which are raised in a spaced manner relative to the contact element.

9. The device of claim 1, wherein the locking element has edge sections which are beveled and serve to engage behind the shoulders such that a sliding surface facilitating the engagement is formed opposite to the shoulders.

10. The device of claim 1, wherein the shoulders on the sides of the receptacle slope toward a free inner side or narrow in their thickness thereby forming a sliding surface, which facilitates the engagement by the locking element.

11. The device of claim 1, wherein the locking element is designed and constructed in the form of a parallelogram or trapezoid, and that in its rotated and engaged state, it comes to lie with its two short edges against the opposing inner walls of the receptacle.

12. The device of claim 1, wherein a raised portion is formed on the locking element which faces the contact element, the raised portion being dimensioned such that in the engaged state of the locking element, it extends from within the receptacle into the region between the shoulders, and that it is dimensioned such as to form an antirotation device for the locking element.

13. The device of claim 1, wherein the contact element includes engagement flanks extending toward the locking element, which engage from the outside at least somewhat in the region between the shoulders, after the rotation of the contact element which leads to the engagement by the locking element behind the shoulders, and which form an antirotation device for the contact element.

14. The device of claim 1, wherein the connecting means comprises an opening provided with an internal screw thread for receiving a threaded connected rod.

15. The device of claim 1, wherein the connecting means includes a central opening in the locking element.

16. The device of claim 15, wherein the opening is provided with an internal screw thread.

17. The device of claim 1, wherein the locking element and the contact element are connected for relative rotation via the connecting means which comprises an anchoring rod which extends through an opening in the contact element into an opening in the locking element.

18. The device of claim 1, wherein the receptacle is designed and constructed as a rail having a substantially U-shaped cross section and with the inwardly projecting shoulders lying in a common plane.

19. A device for mounting objects to ceilings or walls comprising a receptacle adapted for being directly connected to a ceiling or wall, and comprising a channel of U-shaped configuration in transverse cross section and having parallel sides and an inwardly directed shoulder on each side, with the shoulders defining an opening therebetween which opens into the receptacle, an anchoring unit for attachment to the receptacle and comprising a locking element of generally rectangular outline and having a width dimension less than the opening between the shoulders of the receptacle and a length dimension greater than said opening, a contact element sized to overlie said opening and thus engage the shoulders on the outside of the receptacle, said locking element and contact element being maintained in an overlying relationship by an elastic member which supports the elements in an original relative rotational position with respect to an axis which is generally perpendicular to said elements, while permitting the locking element to rotate about said axis with respect to the contact element against a biasing force which urges the locking element back to said original relative position, and with said elastic member being configured and arranged such that during such relative rotation a portion of the elastic member moves between the locking element and the contact element to cause said elements to separate, whereby in use, the anchoring unit may be positioned so that the locking element enters into the opening of the receptacle and with the contact element engaging the shoulders on the outside of the receptacle, and so that upon rotation of the contact member about said axis the locking element is initially restrained against concurrent rotation by contact with the shoulders of the receptacle so as to cause relative rotation of said elements about said axis and a portion of the elastic member to move between and separate the elements and thereby facilitate the positioning of the locking element behind the shoulders, and with the biasing force provided by the elastic member then rotating the locking element back to the original relative rotational position with respect to the contact element so that the locking element is positioned behind the shoulders.

20. The device of claim 19 further comprising an anchoring rod attached to at least one of said locking element and said contact element so as to extend along said axis.

* * * * *